June 28, 1932.   C. S. JARRELL ET AL   1,865,058
ELECTRICAL CONTROLLED VALVE
Filed Jan. 10, 1930
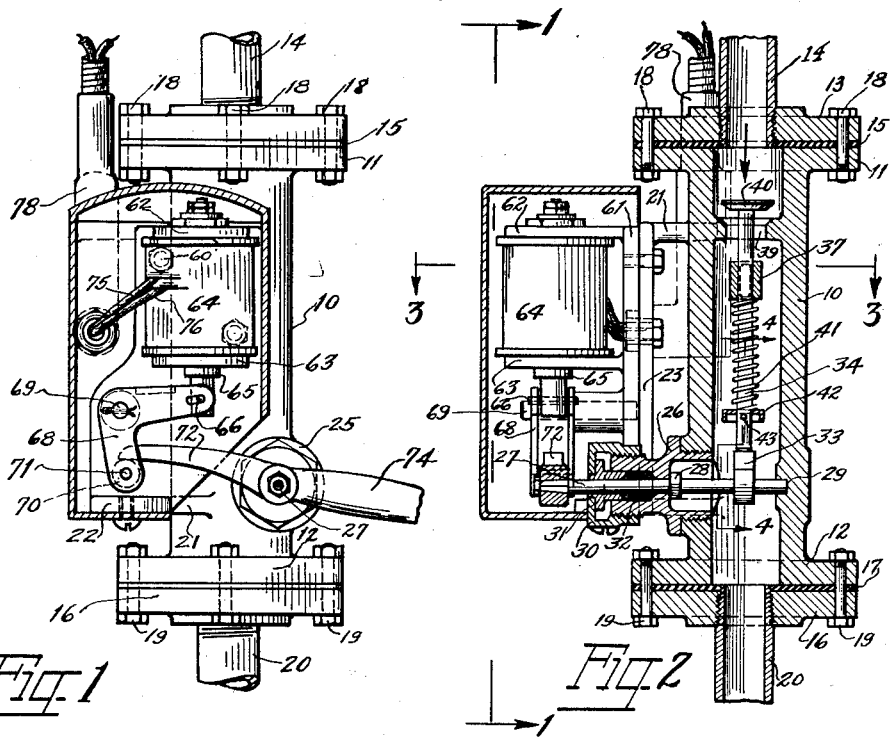
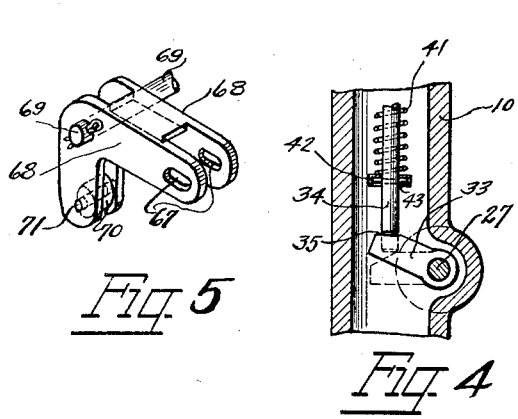
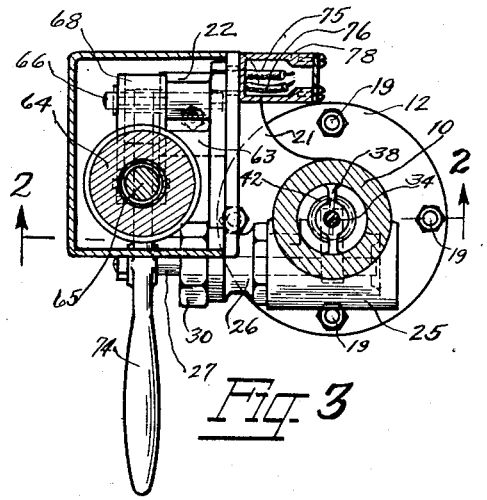
INVENTORS:
C. S. JARRELL AND A. M. WEBB
BY
ATTORNEY.

Patented June 28, 1932

1,865,058

UNITED STATES PATENT OFFICE

CHARLES S. JARRELL AND ADOLPHUS M. WEBB, OF CHARLOTTE, NORTH CAROLINA, ASSIGNORS TO CHARLOTTE CHEMICAL LABORATORIES INC., OF CHARLOTTE, NORTH CAROLINA, A CORPORATION OF NORTH CAROLINA

ELECTRICAL CONTROLLED VALVE

Application filed January 10, 1930. Serial No. 419,999.

This invention relates to a valve which is adapted to automatically close when the electric current is cut off from the system with which this valve and a pipe system is adapted to operate.

An object of our invention is to provide a valve adapted to be placed in a line adapted to conduct fluids, and said valve being adapted to be held in opened position by means of an electric current associated with said system, said valve being adapted to automatically close the very instant the electric current is cut off from the system, so as to prevent any further flow of a fluid which is associated with said system.

One of the principal troubles with other types of solenoid valves is that in the first place said valves have to close themselves against pressure of the fluid, whereas in this valve the pressure of the fluid is utilized for aiding the closing of and the keeping tight of the valve in closed position. In other types of valves the valve stem itself is connected to the magnetic core rod which means that the valve stem then has to move up and down in a stuffing box, which in turn means that if the valve is being used on a high pressure line that this stuffing box has to be kept very tight, which creates additional friction on the valve stem. The results of this is that if the stuffing box is tight the friction prevents satisfactory operation of the valve, and on the other hand if the stuffing box is loose enough for the valve stem to work freely there will be a leakage of the liquid or fluid around the stuffing box.

In our valve as will hereinafter appear the only stuffing box we have is for the trip lever rod which rotates in the stuffing box instead of sliding up and down therein as in the case of other valves. The rotation naturally causes considerably less friction, and in addition this rod can be very small which will only require a very small stuffing box, and tests on this valve in operation show that the stuffing box can be tightened up by hand and held against very high pressure as much as one-thousand pounds or more.

A specific instance of the use to which this valve may be adapted is in an oil burning plant where the oil is sprayed into a burner and air for combustion is supplied with a fan. If the power goes off the fan and oil pumps will stop running but on account of the pressure built up in the oil supply lines, or especially in case of gravity oil feed, the oil will continue to spray in the furnace causing excess of heat. With this valve placed in the supply line the flow of oil will immediately stop when the power goes off. This valve can also be used in connection with temperature equipment, which means that if the temperature gets too high in a certain apparatus the temperature equipment itself will cause a break in the electric lines leading to this valve, and this break will automatically cause the valve to cut the oil supply off.

While we have given specific instances where this valve may be used we desire it to be understood that this valve can be used in any fluid supply line which is associated with an electric line for operation in any system.

Some of the objects of our invention having been stated other objects will appear as the description proceeds, when taken in connection with the accompanying drawing, in which—

Figure 1 is a side elevation partially in cross-section taken along the line 1—1 in Figure 2;

Figure 2 is a vertical cross-sectional view taken along the line 2—2 in Figure 3;

Figure 3 is a transverse cross-sectional view looking downward and taken along the line 3—3 in Figure 2;

Figure 4 is an enlarged vertical cross-sectional view taken along the line 4—4 in Figure 2;

Figure 5 is a perspective view of the bell crank trip lever associated with the solenoid and the valve operating mechanism.

Referring more specifically to the drawing the numeral 10 indicates the valve barrel which has the enlarged portions 11 and 12 at each end thereof, and to the portion 12 an enlarged flange 13 is secured which is adapted to have threadably secured therein a supply pipe 14 with a gasket 15 between the flanges 11 and 13. At the lower end of the valve the similar flange 16 is secured to flange 12 with a gasket 17 therebetween, the flanges 11 and 13 being secured to each other by means of bolts 18 and bolts 19 serve to secure the flanges 12 and 16 together. The flange 16 is adapted to have threadably secured therein the exit pipe 20 which is adapted to supply fluid to any given point after passing through the valve 10.

Cast integral with the valve barrel 10 are projections 21 and 22 which project outwardly and have integral therewith the vertically disposed plate member 23 which is adapted to support the solenoid mechanism as will be presently described. Near the lower portion of valve barrel 10 is the enlargement 25 which extends transversely to one side of the valve barrel, and in one side of this enlargement a hole is provided into which a stuffing box 26 is threadably secured, said stuffing box being adapted to rotatably mount the rod 27 which passes through stuffing box, said rod 27 having an enlargement 28 thereon, and the inner end of said rod 27 being adapted to be rotatably mounted as at 29 in the inner sidewall of valve barrel 10. Threadably secured on the end of the stuffing box 26 is the cap 30, which has inside thereof the packing member 31 which is adapted to hold the packing 32 in position. The end of the rod 27 on the inside of valve barrel 10 has fixedly secured thereon or cast integrally therewith the lever or arm 33, which is adapted to operate the valve stem 34, this arm 33 has the beveled portion 35 on the end thereof which is adapted to support the lower end of valve stem 34 when the valve is in raised position. This valve stem is slidably mounted in a bearing 37, which is integral with a spider or web member 38 on the interior of the valve barrel 10, also cast integral with the valve barrel 10 and on the interior of barrel 10 is the valve seat member 39 onto which a valve 40 on valve stem 34 is adapted to seat when in lowered position.

Loosely secured around the valve stem 34 is a compression spring 41 which is supported at its lower end by means of a washer or disk 42 held in position by means of a pin 43 penetrating the valve stem. It is seen that this spring normally forces the valve downwardly when the same is in raised position as shown in Figure 2.

Secured on the plate portion 23 by means of suitable bolts 60 is a solenoid supporting plate 61, which has the outwardly projecting portions 62 and 63 which support therebetween the solenoid 64, said solenoid having the conventional soft iron core 65 slidably mounted therein with a pin 66 in the lower end thereof which is adapted to work in a slot 67 in one end of bell crank lever 68, which is pivotally connected on the pin 69 which is supported by the plate 61. The other end of this bell crank lever 68 has secured therein the roller member 70 which is rotatably mounted on pin 71, said roller 70 being adapted to engage the reset lever 72, which is fixedly secured on the outer end of the rod 27 and this reset lever has a handle portion 74 by means of which the portion 72 can be raised upwardly to cause the end thereof to rest on top of the roller 70 when the solenoid is energized. This solenoid has the wires 75 and 76 leading therefrom through hole 77, which is connected with the conduit 78 which is a part of the electrical conduit system with which our valve is adapted to be associated.

The method of operation of our valve is as follows:

When the electric power is turned on this valve, the solenoid core rises and the trip reset lever is set by hand and will hold in the position as shown in Figure 1 until the power goes off, at which time the solenoid core drops and the bell crank lever or fulcrum 68 which is pivoted on 69, and which holds the end of the reset lever in elevated position drops down and the roller 70 which holds the reset lever in elevated position moves out in a left-hand direction in Figure 1, which releases the reset lever and causes it to move downwardly with valve stem 34 by means of the pressure in the pipe line itself and also the compression spring 41. This allows the valve to become seated and will therefore instantly cut off the fluid supply through the pipe line. The actual closing of the valve is accomplished partly by the spring but the additional value of this arrangement is that the pressure of the liquid flowing in at the top of the apparatus and pressing against the top surface of the valve, causes it to hold tight. This valve remains closed until the electric current is turned on again which resets the solenoid core, but in order to turn the liquid supply on, the valve has to be reset by hand lever 74 being pressed downwardly to raise the portion 72 upwardly and cause it to assume the position shown in Figure 1.

In the drawing and specification we have set forth a preferred embodiment of our invention, and although specific terms are employed, they are used in a generic and descriptive sense only, and not for purposes of limitation, the scope of our invention being set forth in the appended claims.

We claim:

1. In a valve, a valve housing, a valve seat in said valve housing, a valve mounted in said valve housing, a transversely disposed shaft having a portion thereof mounted in said valve housing, and a portion of said shaft extending outside of the housing, a projection on said shaft within the valve housing adapted to press against the lower end of the valve member to normally press the same upwardly to open position, a lever mounted on one of the ends of the shaft outside of the valve housing, electric means having a bell crank lever engaging said lever on the outside of said valve housing adapted to hold the valve in opened position, resilient means mounted around said valve stem, said resilient means being adapted to move said valve to closed position when the electric means fail to operate.

2. A valve mechanism comprising a housing having a valve and valve stem therein, tension means disposed around the valve stem for moving the valve to closed position, manually operated means for opening said valve against the tension means, and means for holding the valve in open position, said means comprising a solenoid adapted to be normally energized, a bell crank lever pivoted intermediate its ends and having one end thereof engageable by the manually operated means for holding the valve in open position and having the other end thereof connected to the solenoid.

3. A valve housing having a passageway therethrough, the longitudinal center of said passageway occupying a straight line, said housing having means for attaching pipe lines to each end thereof in alinement with said passageway whereby a fluid may be directed in a straight line through the housing, a valve seat in said passageway, a valve and valve stem mounted in said passageway, tension means for moving said valve to closed position, a shaft mounted transversely of said passageway and extending outside the housing, an arm on said shaft whereby the valve and valve stem may be moved to open position, a hand lever on the outer end of said shaft, a bell-crank lever pivoted intermediate its ends and having one end thereof adapted to engage said lever when the lever is raised manually for holding the valve in open position, means for connecting the other end of the bell crank lever to the core of the solenoid whereby energization of the solenoid will raise the bell crank lever to cause its free end to move into the path of the hand lever to hold the valve in open position, and a de-energization will allow the tension means assisted by the flow of the fluid to move the valve to closed position.

4. A valve mechanism comprising a valve housing and a valve mounted therein so as to cause the liquid passing through the valve to exert pressure on top of the valve to have a tendency to close the valve, manual means for opening the valve against said pressure comprising a shaft having an arm thereon adapted to engage said valve, a hand lever on said shaft, a bell crank lever, a solenoid connected to one end of the bell crank lever, and the other end of said bell crank lever when the solenoid is energized having releasable engagement with the hand lever when the hand lever is manually set whereby energization of the solenoid will move the bell crank lever in the path of the hand lever to hold the valve in open position and de-energization of the solenoid will release the hand lever to allow the pressure of the liquid to close the valve.

In testimony whereof we affix our signatures.

ADOLPHUS M. WEBB.
CHARLES S. JARRELL.